United States Patent
Sengupta et al.

[11] Patent Number: 5,830,591
[45] Date of Patent: Nov. 3, 1998

[54] MULTILAYERED FERROELECTRIC COMPOSITE WAVEGUIDES

[76] Inventors: Louise Sengupta, 12 New Haven Blvd., Warwick, Md. 21912; Michael S. Klushens, 2602 Ryegate La., Alexandria, Va. 22308

[21] Appl. No.: 639,152

[22] Filed: Apr. 29, 1996

[51] Int. Cl.⁶ ........................................ B32B 18/00
[52] U.S. Cl. ..................... 428/701; 428/119; 428/702; 385/130; 385/131
[58] Field of Search .................. 428/699, 701, 428/702, 1 A; 385/130, 131

[56] References Cited

U.S. PATENT DOCUMENTS

| | | |
|---|---|---|
| 5,312,790 | 5/1994 | Sengupta ........................... 501/137 |
| 5,427,988 | 6/1995 | Sengupta ........................... 501/137 |
| 5,486,491 | 1/1996 | Sengupta ........................... 501/137 |
| 5,635,433 | 6/1997 | Sengupta ........................... 501/137 |
| 5,635,434 | 6/1997 | Sengupta ........................... 501/138 |
| 5,693,429 | 12/1997 | Sengupta ........................... 428/699 |

*Primary Examiner*—Timothy M. Speer
*Attorney, Agent, or Firm*—Paul S. Clohan; Muzio B. Roberto

[57] ABSTRACT

A multi-layer Ferroelectric composite wave guide in which the effective dielectric constant of the waveguide can be reduced while maintaining tunability. The waveguide is constructed of high and low dielectric constant layers. The multi-layer waveguide is comprised of bias plates which are perpendicular to the laminate direction on direction of film deposition to maintain tunability in the structure.

8 Claims, 3 Drawing Sheets

OXIDE III, 11 LAYERS    BSTO-40 wt% OXIDE III, 10 LAYERS

MULTILAYERED FERROELECTRIC COMPOSITE WAVEGUIDES

GOVERNMENT INTEREST

The invention described herein may be manufactured, used and licensed by or for the U.S. Government without payment to use of any royalty thereon.

BACKGROUND OF THE INVENTION

This patent application is associated with the materials cited in U.S. Pat. No. 5,312,790 granted on May 17, 1994, entitled "Novel Ceramic Ferroelectric Material", U.S. patent application Ser. No. 08/207,446, entitled "Novel Ceramic Ferroelectric Composite Material—BSTO—MgO", U.S. patent application Ser. No. 08/207,447, entitled "Novel Ceramic Ferroelectric Composite Material—BSTO—$ZrO_2$", U.S. patent application Ser. No. 08/215,877, entitled "Novel Ceramic Ferroelectrics for Phased Array Antennas" and U.S. patent application Ser. No. (?) entitled, "Electronically Graded Multilayer Thin And Thick Film Ferroelectric Composites". The present invention is specifically addresses the use of ferroelectric multilayered ceramic composites to reduce the effective dielectric constant of a microwave waveguide without decreasing the tunability. These patent applications are commonly owned by the U.S. Government as represented by the Secretary of the Army and the Secretary of the Navy.

The need exists for the fabrication of multilayered ferroelectric composites for use in microwave waveguides which have improved electronic properties which may be adjusted for a particular intended use. The present invention deals with novel ceramic multilayered ferroelectric waveguides having ideal properties for use, for example, in phased array antenna systems.

A ferroelectric waveguide need not be composed entirely of a single bulk ferroelectric ceramic composite. The effective dielectric constant of the waveguide can be reduced while maintaining the tunability by constructing a multilayered waveguide consisting of layers of moderate and low dielectric constant tape stacks. This type of device could then be used to replace the more expensive current driven ferrites which are currently used in phased array antennas. This invention outlines the construction of such a multilayered ferroelectric waveguide which provides adequate phase shift with a minimal insertion loss, due to ultra low dielectric constants (can be as low as 20) and low loss tangents (<0.005).

Current attempts to reduce the dielectric constants of the waveguides employ the use of porous ceramics, whose properties are less than ideal for their intended application. Porous ceramics of the $Ba_{1-x}Sr_xTiO_3$ (BSTO) type are commonly employed in ceramic phase shifter antennas (Wolfson patent ref). However, these materials display certain deficiencies due to processing difficulties, cost and poor overall electronic and microwave properties. These deficiencies include electronic inhomogeneity, structural weakness, reproducibility, and high loss tangents at 10 GHz and above.

Barium Strontium Titanate ($BaTiO_3$—$SrTiO_3$), also referred to herein as BSTO, has been known to be used for its high dielectric constant (approximately ranging from 200 to 6,000) in various antenna applications. This is set forth by Richard W. Babbitt et al. in their publication, "Planar Microwave Electro-Optic Phase Shifters," Microwave Journal, Volume 35 (6), (June 1992). This publication concludes that there exists a need for additional research to be conducted in the materials art to yield materials having more desirable electronic properties including low insertion loss.

Although the employ of BSTO in phase shifters is known, nowhere in the technical arena of ceramic art has there been any suggestion of the multilayering scheme set forth herein that reduces the overall effective dielectric constant of the given waveguide without reducing the overall tunability. Moreover, the specific BSTO/composite thick film layering schemes combinations, which have enhanced electronic properties, are deemed novel.

The present invention provides for improved materials which exhibit electronic properties which can be adjusted for use, for example, waveguide geometries. The invention herein is superior to other currently used bulk or multilayered ferroelectric materials in the art due to the combination of the BSTO/oxide composite formulations and the layering schemes proposed. The invention is designed to provide tunable materials with low dielectric constants and minimal insertion loss. Therefore, with very little impedance matching, these materials can be used in millimeter wave applications with 77 GHz frequency range.

BRIEF DESCRIPTION OF THE INVENTION

The subject matter of the present invention is related to the fabrication of specific multilayered ferroelectric composite waveguides. These waveguides would have sought after properties in, for example, phased array antenna systems. The sought after properties include (1) low dielectric constants (can be as low as 20) (2) low loss (<0.005); and (3) high tunability )–15% with an electric field of 2.0 V/µm). The dielectric constant is related to the energy storage in the material; whereas, the loss tangent is related to the power dissipation in the same material. In general, the dielectric function is a complex quantity with $\epsilon=\epsilon'-i\epsilon''$; and the loss tangent, tan $\delta=\epsilon''$ $\epsilon=0.005$ or less.

Tunability may be defined as ((dielectric constant with no applied voltage)—(dielectric constant with an applied voltage)) (dielectric constant with no applied voltage). For simplicity purposes, tunability can be represented as $$T = \left( \frac{X - Y}{X} \right) \text{ wherein,}$$

X = (dielectric constant with no applied voltage)
Y = (dielectric constant with an applied voltage).

The composite formulations which comprise the multilayered waveguide combine Barium Strontium Titanate ($BaTiO_3$—$SrTiO_3$) with either alumina ($Al_2O_3$), zirconia ($ZrO_2$) or magnesia (MgO), BSTO—$MgZrSrTiO_3$, BSTO—$MgZrO_3$, BSTO—$MgAl_2O_4$, and BSTO—$MgTiO_3$, or any combination of these formulations. These layered materials, encompassed by the present invention, are superior in that they are homogeneous (throughout the stack), extremely dense, easily machinable, and possess superior electronic properties at both dc and microwave operating frequencies. Moreover, the materials herein have low water absorptivity. Typically these materials will absorb less than 2% by weight of water therein. Hence, the materials within the scope of the present invention are environmentally stable—for example, they have good moisture and temperature stability.

Replacing the currently used ferrite materials with the novel ferroelectric multilayer waveguides described in the present invention will improve the overall performance of a phased array antenna system as well as reduce the cost, weight and size of the antenna per se.

Accordingly, it is an object of the present invention to provide a low insertion loss ferroelectric multilayered waveguide to be used as a beaming steering device suitable for, but not, limited to, use in phased array antenna systems.

It is a further object of the present invention to fabricate a multilayered material exhibiting enhanced electronic properties.

It is still a further object of the present invention to provide a multilayer ferroelectric material having a low dielectric constant (reduces impedance matching), a low loss, and some tunability.

It is a further object of the present invention to provide multilayered waveguides having electronic properties, wherein said electronic properties can be adjusted in such a manner that they can be employed in any discrete element phase shifter design.

It is a further object of the present invention to provide a multilayer ferroelectric material which is easily machinable and has no air gaps between the discrete layers.

Still, it is a further object herein to provide a ferroelectric material which possesses superior electronic properties at dc, microwave and millimeter wave operating frequencies.

The means to achieve these and other objectives of the present invention will be apparent from the following detailed description of the invention and claims.

DETAILED DESCRIPTION OF THE INVENTION

Figure 1:
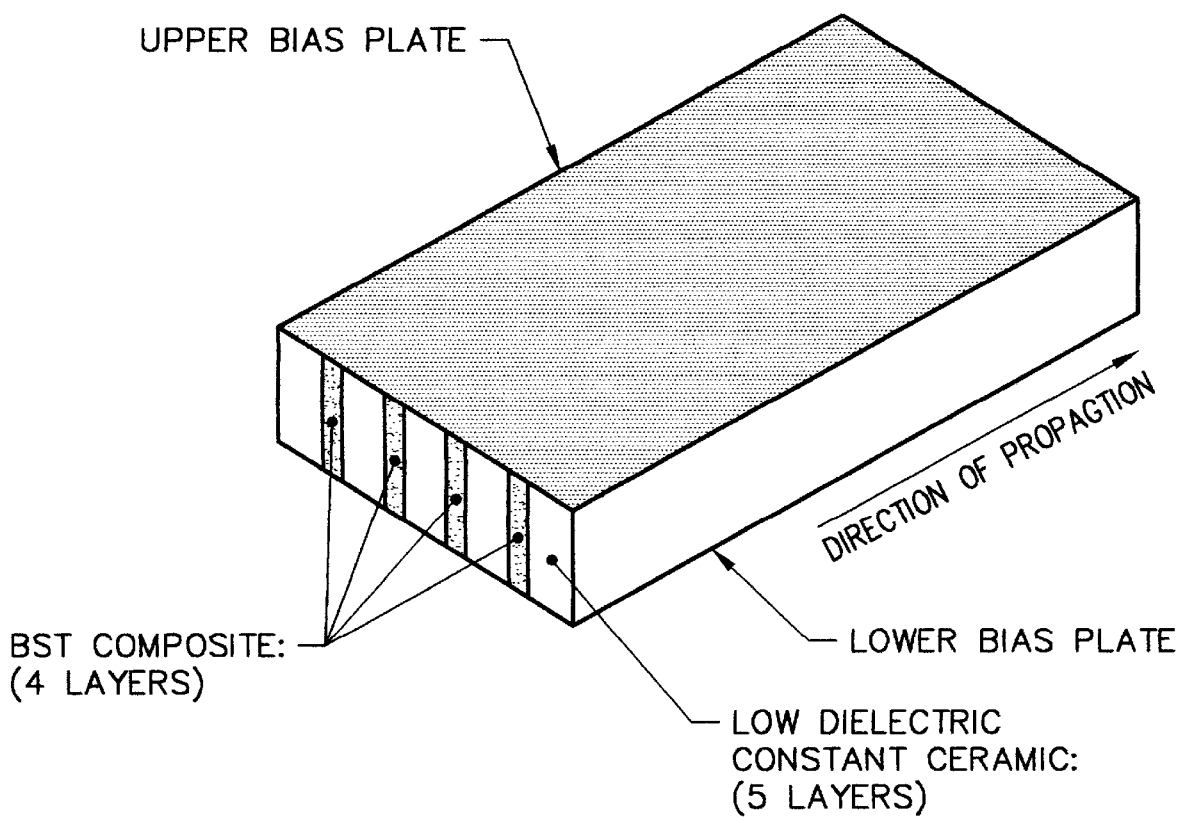
FIG. 1 represents the multilayered BST) Composite Waveguide of Example 1.

The present invention encompasses the fabrication of novel multilayer ceramic waveguides which provide enhanced impedance matching ability due to low dielectric constants and loss tangents. These multilayered materials are superior to other currently used materials employed in microwave devices (phase shifters) since the effective dielectric constant of the waveguide can be reduced while maintaining the same tunability of the most tunable composite used in the composite.

When one considers the optimization in the electronic properties of ceramic materials, the following parameters must be taken into consideration:

(1) Dielectric Constant: Ideally the dielectric constant should be in the range from approximately 5 to 200. The lower dielectric constants are preferable since the impedance matching for these becomes easier. The low dielectric constants (around 5–200) do not decrease the phase shifting ability of the material if a sufficient length of material is used (then a high dielectric constant is not needed). Also, as insertion loss (loss of energy getting into the ceramic) does not depend upon the dielectric constant, it is not effected by lowering the dielectric constant. Since the loss tangent (tan $\delta$) increases with increasing dielectric constant (for these ferroelectric materials), lower dielectric materials tend to have lower loss tangents and therefore, less insertion loss.

(2) Low Loss: The low tangent (intrinsic to the material) serves to dissipate or absorb the incident microwave energy and therefore is most effective in this device when the loss tangent is in the range of 0.001 or less. The low loss tangent serves to decrease the insertion loss and hence increase the phase shift per decibel of loss. The operating frequency is controlled by the loss tangent. Extremely low loss materials (0.0007) can be used at millimeter wave range frequencies.

(3) High Tunability: The tunability of a particular material effects the material's electronic properties by how much the dielectric constant changes with applied voltage. The amount of phase shifting ability is directly related to the tunability; therefore, higher tunabilities are desired. The tunability can be increased to some extent by decreasing the sample thickness. The insertion loss is inversely related to the tunability so that the larger the tunability, the smaller the insertion loss. Optimum electronic properties would have tunabilities of approximately 15% (with 2.0 V/micron). The tunability of the multilayered waveguides are not decreased even though the effective dielectric constant of the stack is reduced.

The composite ceramic materials that comprise the tape-cast multilayered waveguides within the scope of the present invention are $Ba_{1-x}Sr_xTiO_3$—MgO, BSTO—Alumina ($Al_2O_3$), BSTO—Zirconia ($ZrO_2$), BSTO—MgZrSrTiO_3, BSTO—MgZrO_3, BSTO—MgAl_2O_4, and BSTO—MgTiO_3, wherein x is greater than 0.0 but less than or equal to 0.75. These formulations may be referred to as Barium Strontium Titanate and nonferroelectric oxide compounds. The weight ratios of Barium Strontium Titanate (BSTO) to the compounds may range from 99% wt.–40% BSTO to 1% wt–60% wt., $Al_2O_3$, $ZrO_2$, MgO, $MgZrSrTiO_3$, $MgZrO_3$, $MgAl_2O_4$ or $MgTiO_3$. It has been found that with current processing controls that the electronic properties of BSTO—magnesia compound are reproducible to within 2%. Hence, once a specific formulation of the BSTO—oxide compound is determined to be suitable for a specific purpose, the material properties can be accurately reproduced.

The above compositions are then tape-cast and stacks of the tapes are laminated according to the information given below. The microwave characteristics of the layered stacks have been modeled using the matrix element technique described in Appendix A of the report "*Nonlinear Dielectric Traveling Wave Antennas for Radar Systems*". (M. Kluskens, NRL Tech. Report, in preparation, J. S. Horwitz, D. B. Chrisey, J. M. Pond, R. C. Y. Auycung, C. M. Cotell, K. S. Grabowski, P. Dorsey, and M. S. Kluskens, Integrated Ferroelecrrics, vol 8, pp. 53–64, 1995).

EXAMPLE 1

Figure 2:
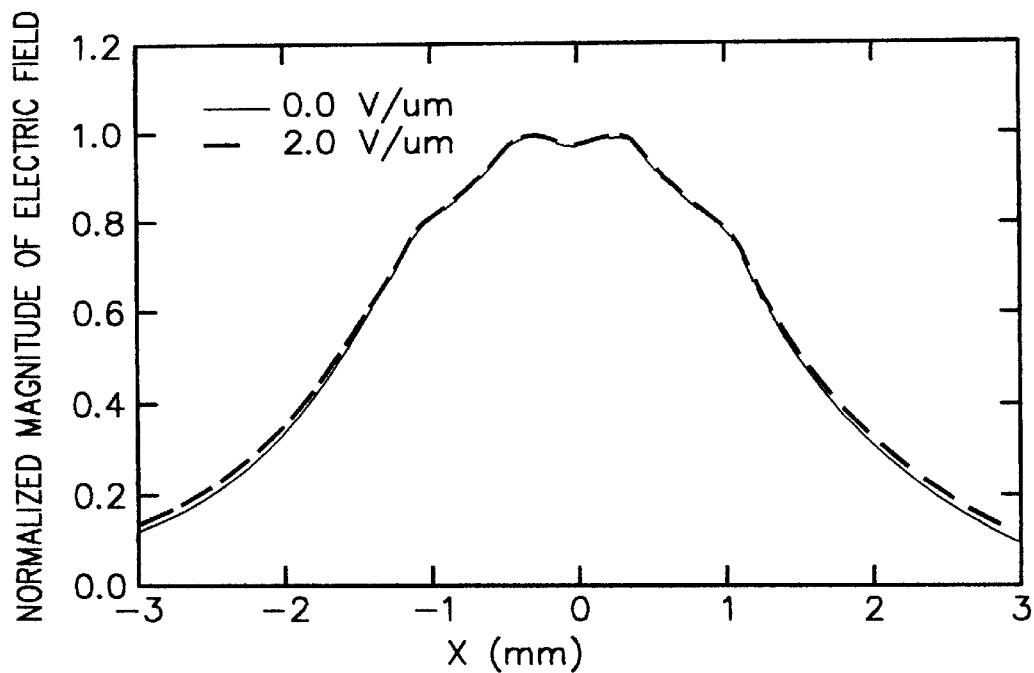
FIG. 2 represents the electric field distribution of the TM dominant mode of a multilayer composite waveguide of Example 1.

FIG. 1 illustrates a multilayered waveguide using BSTO—MgO nonaqueous tapes. To maintain the full bias electric field in the BSTO composite the layers are oriented perpendicular to the bias plates. If the layers were oriented parallel to the bias plates the bias field strength in the BSTO composites would be greatly reduced. The waveguide can be approximately analyzed using the effective dielectric constant method and the equations in Appendix A of the report "*Nonlinear Dielectric Traveling Wave Antennas for Radar Systems*". (M. Kluskens, NRL Tech. Report, in preparation, J. S. Horwitz, D. B. Chrisey, J. M. Pond, R. C. Y. Auycung, C. M. Cotell, K. S. Grabowski, P. Dorsey, and M. S. Kluskens, Integrated Ferroelectrics, vol 8, pp. 53–64, 1995). For an example, consider the general geometry shown in FIG. 1 with five 0.5 mm thick layers of MgO ($\epsilon_r$=14, tan $\delta$=0.005) separated by four 0.2 mm thick layers of the ceramic composite $Ba_{0.6}Sr_{0.4}TiO_3$—60 wt % MgO ($\epsilon_r$=90, tan $\delta$=0.005, tunability of 10.4% at 2.0 V/$\mu$m). For the TM polarization (microwave electric field parallel to the layers) the effective dielectric constant and loss tangent of the waveguide is $\epsilon_{r,eff}$=26, tan $\delta_{eff}$=0.006 at 10 GHz with a tunability of 9.3% for a bias field of 2.0 V/$\mu$m. The electric field distribution of the dominant mode for this waveguide is shown in FIG. 2 for bias fields of 0.0 and 2.0 V/$\mu$m. For this polarization the effective dielectric is relatively insensitive to the thickness of the waveguide, i.e., the distance between the metal bias plates. The TE polarization (microwave electric field parallel to the bias plates) is very sensitive to the thickness of the dielectric waveguide, for a thickness of 10 mm the effective dielectric constant and loss tangent of the waveguide at 10 GHz is approximately $\epsilon_{r.eff}=4.5\pm0.4$ and tan $\delta_{eff}$ with an approximate tunability 13% for bias field of 2.0 V/μm.

EXAMPLE 2

Figure 3:
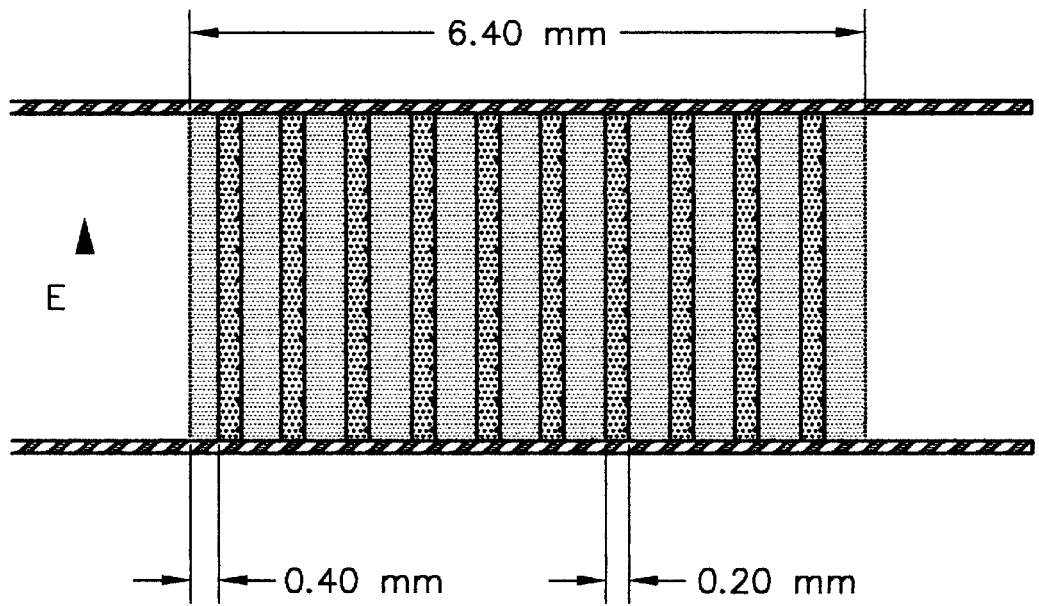
FIG. 3 represents the multilayer BSTO composite waveguide of Example 2.

FIG. 3 illustrates the cross-section of another multilayered waveguide using BSTO—MgO non-aqueous tapes. The dielectric waveguide consists of eleven 0.4 mm thick of MgO ($\epsilon_r=14$, tan $\delta=0.005$) separated by ten layers of 0.2 mm layers of $Ba_{0.6}Sr_{0.4}TiO_3$—40 wt % MgO ($\epsilon_r=360$, tan $\delta=0.005$, tunability=14% at 2.0 V/μm). For the lowest mode of the TM polarization (microwave electric field parallel to the layers), the effective dielectric constant and loss tangent of the waveguide at 10 GHz are approximately, $\epsilon_{r.eff}=133$ and tan $\delta_{eff}=0.0006$. The effective dielectric constant of the waveguide at 10 GHz with a bias field of 2.0 V/μm is approximately $\epsilon_{r.eff}=114$ for an approximate tunability of 14.2%.

EXAMPLE 3

Figure 4:
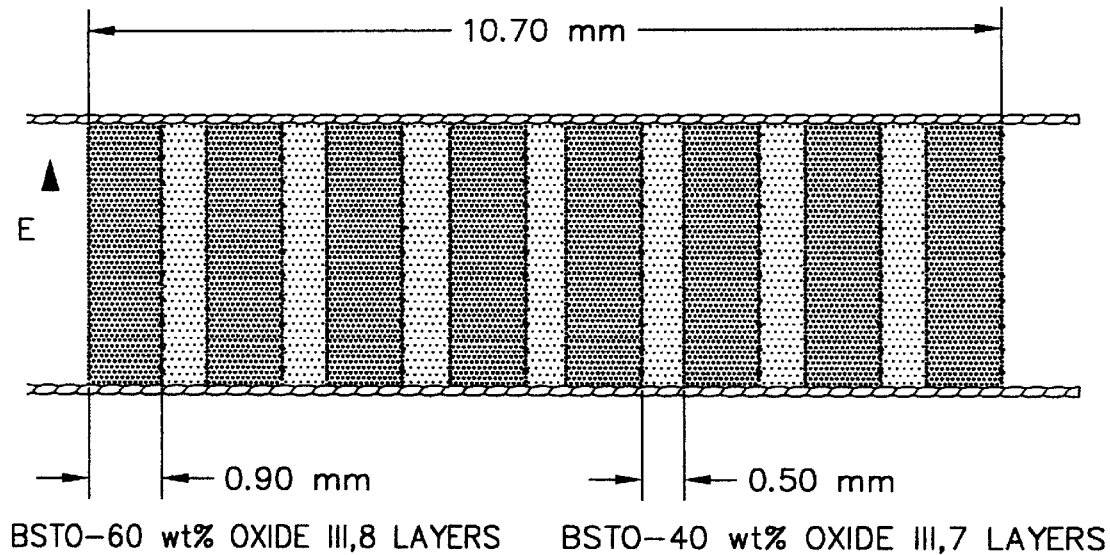
FIGS. 4 & 5 represent the multilayer BSTO composite waveguide of Example 2.

FIG. 4 illustrates the cross-section of another multilayered waveguide using BSTO—MgO non-aqueous tapes. The dielectric waveguide consists of eight 0.9 mm thick layers of $Ba_{0.6}Sr_{0.4}TiO_3$—60 wt % MgO ($\epsilon_r=90$, tan $\delta=0.005$, tunability of 10.4% at 2.0 V/μm) separated by seven 0.5 mm layers of $Ba_{0.6}Sr_{0.4}TiO_3$—40 wt % MgO ($\epsilon_r=360$, tan $\delta=0.005$, tunability=14% at 2.0 V/μm). For the lowest order TM mode (microwave electric field parallel to the layers), the effective dielectric constant and loss tangent of the waveguide at 10 GHz are approximately $\epsilon_{r.eff}=214$, tan $\delta_{eff}=0.006$ at 10 GHz is approximately 152. The effective dielectric constant of the waveguide at 10 GHz with a bias field of 2.0 V/μm is approximately $\epsilon_{r.eff}=182$ for an approximate tunability of 15.1%.

Ceramic Processing and Tape-Casting

Powder forms of Barium Titanate and Strontium Titanate were obtained from Ferro Corporation, Transelco Division, Pen Yan, N.Y. (product Nos. 219-6 and 218 respectively), stoichiometrically mixed to achieve $Ba_{0.6}Sr_{0.4}TiO_3$ and ball-milled in ethanol using 3/16" diameter alumina media for 24 hrs. The resulting BSTO was then air-dried, calcined at 1100° C. and mixed with the oxide (MgO) in the proper weights (0, 10, 20, 40, 60 and 100 wt % MgO) and ball-milled again in a slurry of ethanol using the alumina grinding media for an additional 24 hrs. The resulting composites were then air-dried and subsequently sieved with a U.S. standard sieve series #60 (250 micron) sieve. The proper weight percent of the each ceramic composite was determined from the following equation and then added to the ceramic binder formulation, product #B73210. Ferro Corp. Electronic Materials Division, San Marcos, Calif.

$$\text{Weight \%}=1\ [(0.01)-\{[1.0\ (18.5)(CSG)][\{100(60-2(CSA-3))\}-1]\}] \quad (1)$$

Ceramic
where:
CSG=Ceramic Specific Gravity in g cc
CSA=Ceramic Surface Area in m² g
The tapes were cast onto Teflon coated mylar sheets at a doctor blade setting of 20 mils. This resulted in green body thicknesses from 5 to 13 mils. The tapes were then removed from the mylar carriers. Single layer tapes were either fired at temperatures which had been previously determined by employing a deflectometer such as Mitutoyo digimatic indi-cator and miniprocessor (Mitutoyo Corp., Paramus, N.J.) or were screen-printed with a conductive ink (see below) and then fired. The laminated structure was accomplished by stacking layers of tapes. The part was uniaxially pressed in a heated platen (65° C.) to a pressure of 1000 psi. This structure was sintered at 1500° C. and subsequently metal-lized with ink #E3309 (see below). The ink used for this was product #E1162, 40% Au, 20% Pd and 40% Pt (firing temperature of 1350° C.), Ferro Corp., Electronic Materials Div., Santa Barbara, Calif. Also fired tapes (10, 20, 40 and 60 wt % MgO) were screen printed with product #E3309 and subsequently fired at 850° C.

Table 1 shows the densities which were obtained from He pycnometer measurements for the BSTO, BSTO 10 wt % MgO, BSTO 20 wt % MgO, BSTO 40 wt % MgO, BSTO/60 wt % MgO.

TABLE 1

Thicknesses and Densities of BSTO-MgO Ceramic Composite Tapes and Laminate.

| MgO Content (wt %) | Thickness (mils, microns) | Pyonometrix Density (g/cc) |
|---|---|---|
| 0 wt % | 4.4, 112.0 | 5.549 |
| 10 wt % | 2.5, 64.3 | 5.413 |
| 20 wt % | 3.6, 92.3 | 5.006 |
| 40 wt % | 1.8, 45.4 | 4.420 |
| 60 wt % | 2.7, 69.0 | 4.254 |
| pure MgO | 5.3, 133.7 | 3.584 |

MgO non-aqueous single layer tapes.

The real part of the dielectric constant, $\epsilon'$, tan $\delta$, and the % tunability were determined for all the composites. The electronic properties of the materials were measured using an HP4284A LCR meter at a frequency range of 1 KHz–1 MHz. The tunability measurements were performed with an applied electric field of 2.0 V/micron (μm).

Elecgtronic Properties

The results for the electronic properties of the BSTO MgO bulk ceramics, and tapes are shown in Table II. The dielectric constants and loss tangents of the tape-cast specimens similar to the bulk composites, decrease with increase in MgO content and vary less than 2% with frequency (from 1 KHz–1 MHz). The magnitude of the dielectric constants are very similar to those of the bulk ceramics.

TABLE II

Electronic Properties Tapes and Laminated Tape Stack measured at 1 KHz (Ink 1 = #E1162, 1350° C., Ink 2 = #E3350, 850° C.)

| MgO Content (wt %) | Dielectric Constant | Loss Tangent | % Tunability | Electric Field (V/μm) |
|---|---|---|---|---|
| 0.0 | 3192.2 | 0.0056 | 43.52 | 2.00 |
| 10.0 | 1390.2 | 0.0005 | 15.03 | 2.00 |
| 20.0 | 779.10 | 0.0049 | 14.30 | 2.00 |
| 40.0 | 357.30 | 0.0041 | 14.00 | 2.00 |
| 60.0 | 91.16 | 0.0008 | 10.41 | 2.00 |

The loss tangents of the tapes are also almost the same as those measured for the bulk ceramics. The % tunability of the tapes as well as the bulk material is around 15.00% with 2.00 V/μm at 10 wt % MgO and only reduces to around 12% at 60 wt % MgO. This trend was explained previously in the bulk ceramics by the position of the Curie temperatures and the size of the additive (MgO). The addition of MgO shifts the Curie temperature of the material to −30° C. (from 1 wt % to 50 wt % oxide content) and to <−55° C. for >60 wt % oxide content. This accounts for the reduction in the loss tangent. The small size of the additive permits this tunability to be maintained up to 60 wt % MgO content.

MODIFICATIONS

Figure 5:
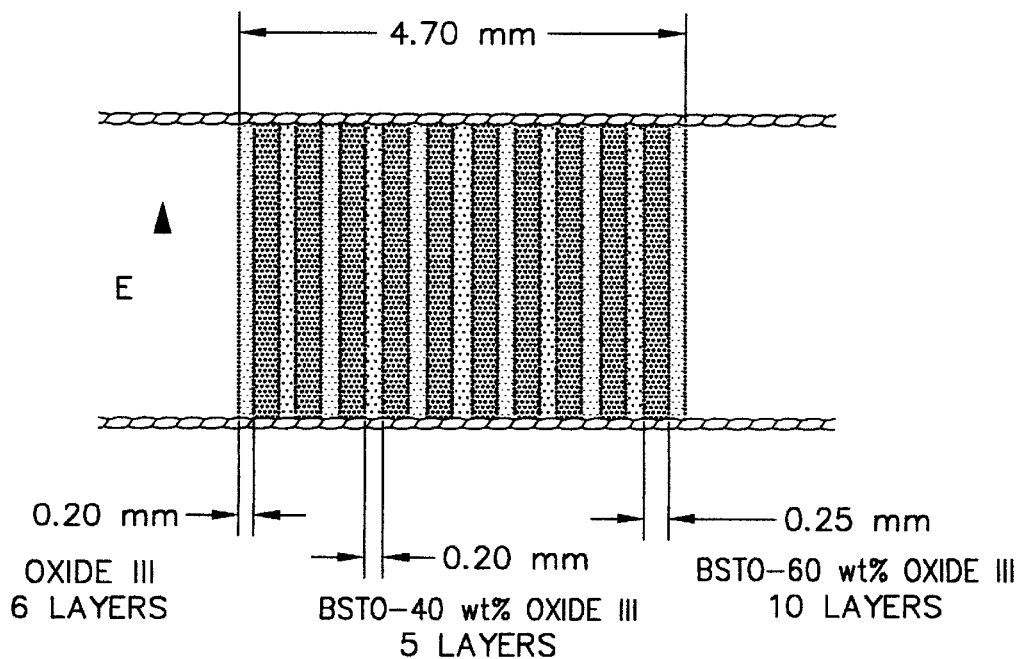

The layering schemes can be altered to accommodate any number of waveguide designs. For example ternary layering scheme can be devised if appropriate. As shown in FIG. 5, such a scheme may consist of five repeated subunits with a center 0.2 mm layer of $Ba_{0.6}Sr_{0.4}TiO_3$—40 wt % MgO ($\epsilon_r=360$, tan $\delta=0.005$, tunability=14% at 2.0 V/$\mu$m) surrounded by 0.25 mm thick layers of $Ba_{0.6}Sr_{0.4}TiO_3$—60 wt % MgO ($\epsilon_r=90$, tan $\delta=0.005$, tunability of 10.4% at 2.0 V/$\mu$m) which are in turn surrounded by 0.2 mm thick layers of MgO ($\epsilon_r=14$, tan $\delta=0.005$). For the lowest order TM polarized mode (microwave electric field parallel to the layers), the effective dielectric constant and loss tangent at 10 GHz are approximately $\epsilon_{r,eff}=1.36$ and tan $\delta_{eff}=0.006$. The effective dielectric constant of the waveguide at 10 GHz with a bias field of 2.0 V/$\mu$m is approxiamtely $\epsilon_{r,eff}=117$ for an approximate tunability of 14.1%. Somone skilled in the art can design any number of multilayer layered waveguides using the composite soutlined in this invention to produce any dominant microwave mode of choice.

The materials can be tape-cast, screen printed or deposited by thin film techniques depending on the thickness of the layers as dictated by the frequency of operation. Also the layers need not be comprised of the materials shown in the examples. Indeed, any combination of high and low dielectric constant materials (including polymers, other ceramic combinations, and porous materials) which meet the specifications desired by the antenna designer can be employed. Also any combination of the ceramic composites into multilayers can be employed and can be designed by someone skilled in the art. These combinations include the use of the composites with any other high or low dielectric constant materials as well using any combination of the composites per single layer or per multilayer structure.

I claim:

1. A multi-layer ferroelectric composite wave-guide comprising:

a biased, tape cast laminated layers of Barium-Strontium-Titanate represented by the formula $Ba_{1-x}Sr_xTiO_3$, wherein x is greater than 0.0, but less than or equal to 0.75, and a binary compound selected from the group consisting of $ZrO_2$, $Al_2O_3$, MgO, $MgZrO_3$, $MgZrTiO_3$, $MgAl_2O_4$, and $MgTiO_3$, in an amount sufficient to provide a composite having a dielectric constant in the range of approximately 5 to 200, a low loss tangent of approximately 0.001, and tunability of approximately 10.41% to about 15.03% at an electric field of 2 V/micron.

2. The multi-layer ferroelectric composite wave-guide of claim 1, comprising biased plates positioned perpendicular to the laminate direction.

3. The multi-layer ferroelectric composite wave-guide of claim 1, wherein the weight ratio of said Barium-Strontium-Titanate to the binary compound is in the range of from approximately 99%–40% Barium-Strontium-Titanate to approximately 1%–40% binary compound.

4. The multi-layer ferroelectric composite wave-guide of claim 1, wherein the weight of said Barium-Strontium-Titanate to said binary compound is in the ranges of approximately 70% Barium-Strontium-Titanate to 30% binary compound.

5. The multi-layer ferroelectric composite wave-guide of claim 1 comprising alternating layers of high dielectric constant and low dielectric constant materials sufficient to produce a tunability of >5% with 2.0 V/micron.

6. The multi-layer ferroelectric composite wave-guide of claim 5 wherein the alternating layers of the high dielectric constant material are 400 <$\epsilon_r$<1500, and the alternating layer of the low dielectric constant material are 11<$\epsilon_r$<100.

7. The multi-layer ferroelectric composite wave-guide of claim 6, wherein the alternating layer of the high dielectric constant is a screen printed layer of high constant material deposited onto a alternating layer of a low dielectric constant substrate.

8. The multi-layer ferroelectric composite wave-guide of claim 7, further comprising bias means wherein the bias means is a plate positioned perpendicular to the printed screen and to the alternating layer of a low dielectric constant substrate.

* * * * *

UNITED STATES PATENT AND TRADEMARK OFFICE
CERTIFICATE OF CORRECTION

PATENT NO : 5,830,591
DATED : Nov 3, 1998
INVENTOR(S): Louise Sengupta and Michael S. Klushens It is certified that error appears in the above-identified patent and that said Letters Patent is hereby corrected as shown below:

On the title page, item [76] second inventor's name should read:
Michael S. "Klushens"--Kluskens--

Signed and Sealed this

Sixth Day of April, 1999

*Attest:*

Q. TODD DICKINSON

*Attesting Officer*     *Acting Commissioner of Patents and Trademarks*